United States Patent
Li

(10) Patent No.: US 10,104,201 B2
(45) Date of Patent: Oct. 16, 2018

(54) METHOD FOR SHARING MICROBLOG INFORMATION

(71) Applicant: Tie Li, Guangdong (CN)

(72) Inventor: Tie Li, Guangdong (CN)

(*) Notice: Subject to any disclaimer, the term of this patent is extended or adjusted under 35 U.S.C. 154(b) by 205 days.

(21) Appl. No.: 15/025,546

(22) PCT Filed: Aug. 18, 2014

(86) PCT No.: PCT/CN2014/084617
§ 371 (c)(1),
(2) Date: Mar. 28, 2016

(87) PCT Pub. No.: WO2015/043336
PCT Pub. Date: Apr. 2, 2015

(65) Prior Publication Data
US 2016/0241673 A1    Aug. 18, 2016

(30) Foreign Application Priority Data
Sep. 30, 2013 (CN) .......................... 2013 1 0464697

(51) Int. Cl.
*H04L 29/08* (2006.01)
*H04L 12/58* (2006.01)

(52) U.S. Cl.
CPC ............ *H04L 67/325* (2013.01); *H04L 51/32* (2013.01); *H04L 67/2814* (2013.01)

(58) Field of Classification Search
CPC .... H04L 67/2814; H04L 67/325; H04L 51/32
See application file for complete search history.

(56) References Cited

U.S. PATENT DOCUMENTS

| | | | |
|---|---|---|---|
| 2013/0073588 A1* | 3/2013 | Cheng | G06F 17/30699 707/769 |
| 2014/0181090 A1* | 6/2014 | Homsany | G06F 17/3053 707/723 |
| 2014/0365568 A1* | 12/2014 | Huang | H04L 65/4015 709/204 |

FOREIGN PATENT DOCUMENTS

| | | |
|---|---|---|
| CN | 102487486 A | 6/2012 |
| CN | 103067247 A | 4/2013 |
| CN | 103167434 A | 6/2013 |

OTHER PUBLICATIONS

International Search Report of PCT Patent Application No. PCT/CN2014/084617 dated Nov. 19, 2014.
(Continued)

*Primary Examiner* — Kim T Nguyen

(57) ABSTRACT

Disclosed is a method for sharing microblog information. The method includes the following steps: step S10: editing information, and setting grades for the information according to the importance degree of the information; step S11: sending the information for which the grades are set to a server for being shared on the internet; and step S12: obtaining, by an information receiving end, the information at the corresponding grades according to a requirement of a user for the information grades. In the method for sharing microblog information, by setting grades for the information and limiting quantity of the information that is sent by the user in unit time and is at different grades, the user can read all information shared by friends and can read important information that is sent in unit time and includes a limited quantity of information, thereby improving the efficiency of sharing the microblog information.

8 Claims, 1 Drawing Sheet

(56) References Cited

OTHER PUBLICATIONS

1st Office Action of counterpart Chinese Patent Application No. 201310464697.3 dated Jan. 12, 2016.

* cited by examiner

METHOD FOR SHARING MICROBLOG INFORMATION

FIELD OF THE INVENTION

The present invention relates to computer and internet technology, and more particularly to a method for sharing microblog information.

BACKGROUND OF THE INVENTION

With the development of internet applications, some tools for sharing information, such as twitter, microblog and so on, have been widely used by most of the netizens and become essential software tools for the netizens. They are widely used not only in our leisure and entertainment life but also in our work. Thus, the users make higher demands for usability, stability and safety of microblog. The main purposes of the twitter and microblog are to realize a mode of sharing information including "one-to-many" and "many-to-one". By means of this, the information can be spreaded and transmitted very quickly. The "one-to-many" means that the information can be spreaded from one people to many people; and the "many-to-one" means that one people can obtain information from thousands of other people at the same time.

When use this type of application, the user generally follows many friends, thus the user will receive lots of information shared by the friends for a period of time. The existing method for sharing information is to display all of the information received by the user in time sequence, or in a way of intelligent sharing or in a way of grouping. However, if someone follows too many friends, some information posted by some friends may be displayed after dozens of or hundreds of information due to the influence of post time, thus he/she needs to spend a lot of time to read a lot of information every day, otherwise the user maybe miss some important information, thereby reducing the efficiency of sharing the microblog information.

SUMMARY OF THE INVENTION

An object of the present invention is to provide a method for sharing microblog information so as to overcome the defects of the prior art. In the method for sharing microblog information, by setting grades for the information and limiting quantity of the information that is sent by the user in unit time and is at different grades, the user can read all information shared by friends and can read important information that is sent in unit time and includes a limited quantity of information, thereby improving the efficiency of sharing the microblog information.

To achieve above object, there is provided a technical solution as follows:

A method for sharing microblog information, including following steps:

Step S10: editing information, and setting grades for the information according to importance degree of the information;

Step S11: sending the information for which the grades have been set to a server for being shared on internet; and Step S12: obtaining, by an information receiving end, the information at the corresponding grades according to a requirement of a user for the information grades.

Preferably, in the step S11, an information quantity limiter is provided for limiting quantity of the information that is sent by the user in unit time and is at different grades.

Preferably, in the step S10, an information editor is provided for inputting information.

Preferably, in the step S10, a label setting unit is provided for setting grades for the information.

Preferably, in the step S12, a label reader is provided for being invoked to obtain the grades of the information after the information has been received.

Preferably, in the step S12, setting more than one information group by an information grouping unit, the information groups have different priorities, and by means of the information grouping unit, the information is categorized into corresponding information groups according to the grades of the information.

Preferably, the information groups are sequentially arranged according to a priority order.

Preferably, in each information group, more than one piece of information is sequentially arranged according to a post time.

Preferably, the information groups have different group names.

In the method for sharing microblog information of the present invention, at an information sending end, firstly edit information, and set grades for the information according to importance degree of the information and then send the information for which the grades have been set to a server for being shared on internet; and at an information receiving end, obtain the information at the corresponding grades according to a requirement of a user for the information grades. In the method for sharing microblog information, by setting grades for the information and limiting quantity of the information that is sent by the user in unit time and is at different grades, the user can read all information shared by friends and can read important information that is sent in unit time and includes a limited quantity of information, thereby improving the efficiency of sharing the microblog information.

DETAILED DESCRIPTION OF ILLUSTRATED EMBODIMENTS

Some embodiments of the present invention will be described as follows, by way of example only, with reference to the accompanying drawings.

Figure 1:
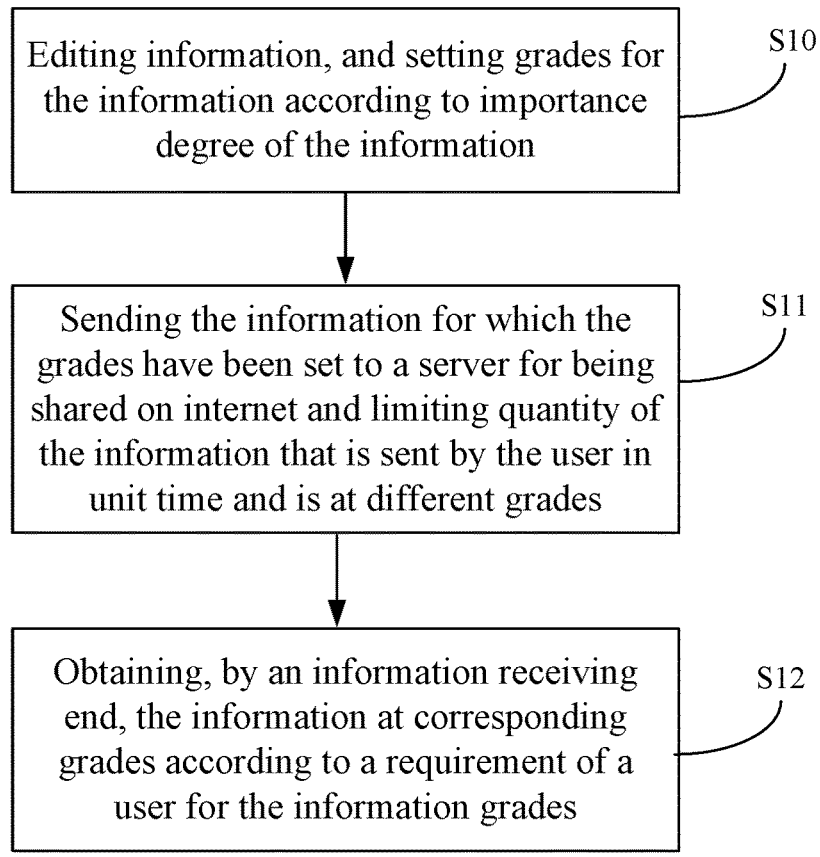
FIG. 1 is a flow diagram illustrating a method for sharing microblog information of the present invention.
Figure 2:
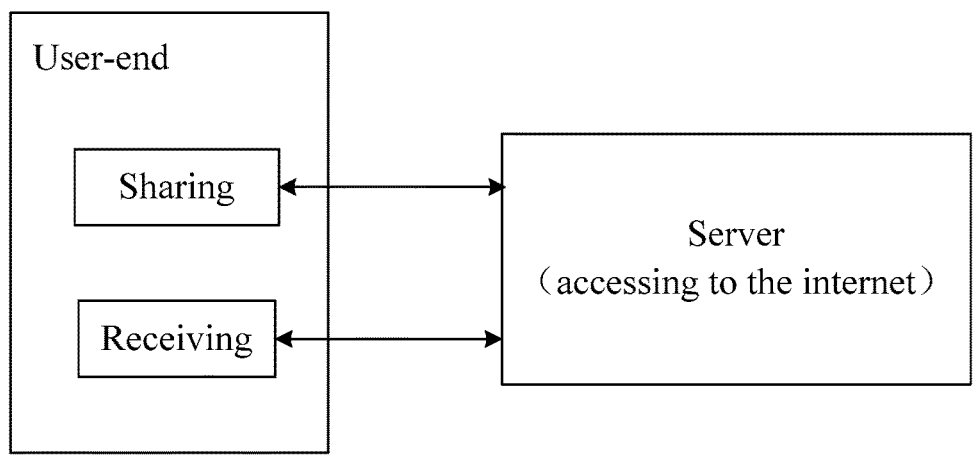
FIG. 2 is a schematic diagram illustrating the transmitting process of microblog information according to the present invention.

FIG. 1 and FIG. 2 illustrating a method for sharing microblog information of the present invention. As shown in FIG. 1 and FIG. 2, the method for sharing microblog information can be achieved based on microblog software. Both of the microblog information sending end and the microblog information receiving end are pre-configured with an information editor, a label setting unit, a label reader and an information grouping unit. Based on this, the method for sharing microblog information includes the steps as follows:

Step S10: editing information, and setting grades for the information according to importance degree of the information.

Further, the step S10 is carried out by invoking the information editor and the label setting unit. The information editor is used for editing information and the label setting unit is used for setting grades for the information. Thus, the information, which has been processed by carrying out this step S10, includes information content and grade label so that the receiving end can divide the information into groups and categorize the information easily. In addition, if the user does not set grades for the information when editing the information, the information defaults to lowest priority, that is the importance degree of the information is lowest.

Step S11: sending the information for which the grades have been set to a server for being shared on internet. In a practical application, if the user does not set grades for the information or wants to change the grades of the information, the grades of the information still can be added or be changed.

In this step, an information quantity limiter is provided for limiting quantity of the information that is sent by the user in unit time and is at different grades. For example, the grades of the information may include very importance, importance and ordinary grade and so on. In a specific time period such as per day, per week or per month, the quantity of the information that is sent by the user can be set as follows: the very important one is limited to 5 items/week; and the important one is limited to 10 items/day. Additionally, the above information also can defaults to ordinary grade and allow to be sent more in a specific time period, such as 1000 items/day. The quantity limit of the information also can be dynamic or intelligent.

Step S12: obtaining, by an information receiving end, the information at corresponding grades according to a requirement of a user for the information.

Further, in this step S12, more than one information group is set by the information grouping unit, the information groups have different priorities, and by means of the information grouping unit, the information is categorized into corresponding information groups according to the grades of the information. The label reader is invoked to obtain the grades of the information after the information has been received, and then the information is categorized into corresponding information groups according to the grades of the information.

In order to distinguish the information groups, the information groups are sequentially arranged according to a priority order and the information groups have different group names. Each of the information groups includes the information which has corresponding importance degree so that the user can obtain the targeted information content easily.

In regard to display way of information entry, in each information group, more than one piece of information is sequentially arranged according to a post time. In a practical application, the information groups can be set and an information entry setting unit can be invoked by the receiving end. The information entry setting unit is provided for setting quantity of the information entry in each information group.

In the method for sharing microblog information of the present invention, at an information sending end, firstly edit information, and set grades for the information according to importance degree of the information and then send the information for which the grades have been set to a server for being shared on internet; and at an information receiving end, obtain the information at the corresponding grades according to a requirement of a user for the information grades. In the method for sharing microblog information, by setting grades for the information and limiting quantity of the information that is sent by the user in unit time and is at different grades, the user can read all information shared by friends and can read important information that is sent in unit time and includes a limited quantity of information, thereby improving the efficiency of sharing the microblog information.

Above descriptions of embodiments are provided for further illustrating the technical content of the present invention, so as to facilitate understanding and it should be understood that the invention is not to be limited to the disclosed embodiments. Any technique extension and recreation according to the present invention should be included within the scope of protection of the invention.

What is claimed is:

1. A method for sharing microblog information, comprising following steps:
    step S10: editing, by an information sending end, information, and setting, by the information sending end, grades for the information according to importance degree of the information;
    step S11: sending, by the information sending end, the information for which the grades have been set to a server for being shared on internet; and
    step S12: obtaining, by an information receiving end from the server, the information at corresponding grades according to a requirement of a user of the information receiving end for the information grades;
    wherein in the step S11, an information quantity limiter is provided in the server for limiting quantity of the information that is sent by a user of the information sending end in unit time and is at different grades, the quantity limit of the information being dynamic or intelligent, and the quantity of the information in each grade being limited respectively.

2. The method for sharing microblog information according to claim 1, wherein in the step S10, an information editor is provided in the information sending end for inputting information.

3. The method for sharing microblog information according to claim 1, wherein in the step S10, a label setting unit is provided in the information sending end for setting grades for the information.

4. The method for sharing microblog information according to claim 3, wherein in the step S12, a label reader is provided in the information receiving end for being invoked to obtain the grades of the information after the information has been received.

5. The method for sharing microblog information according to claim 1, wherein in the step S12, setting more than one information group by an information grouping unit in the information receiving end, the information groups have different priorities, and by means of the information grouping unit, the information is categorized into corresponding information groups according to the grades of the information.

6. The method for sharing microblog information according to claim 5, wherein the information groups are sequentially arranged according to a priority order.

7. The method for sharing microblog information according to claim 5, wherein in each information group, more than one piece of information is sequentially arranged according to a post time.

8. The method for sharing microblog information according to claim 5, wherein the information groups have different group names.

* * * * *